United States Patent [19]

Backus et al.

[11] 3,995,509

[45] Dec. 7, 1976

[54] ROTATING HINGE PIN FOR SPRING LOADED GEAR BOX

[75] Inventors: Lester Frank Backus, Charlotte; Donald Henry Spawn, S. Burlington, both of Vt.

[73] Assignee: General Electric Company, Burlington, Vt.

[22] Filed: Nov. 7, 1975

[21] Appl. No.: 629,747

[52] U.S. Cl. .................................. 74/413; 74/467; 89/41 R; 89/41 M
[51] Int. Cl.² ...................... F16H 1/06; F16H 1/20; F41G 5/00
[58] Field of Search ......... 74/412 R, 421 R, 421 A, 74/413, 467, 332; 89/41 R, 41 M, 41 H, 41 D

[56] References Cited

UNITED STATES PATENTS

| 2,484,869 | 10/1949 | Zeidler | 89/41 R X |
|---|---|---|---|
| 3,429,222 | 2/1969 | Whiston et al. | 89/41 M |
| 3,854,553 | 12/1974 | Miller | 184/6.2 |
| 3,933,053 | 1/1976 | Bartels | 74/413 |

*Primary Examiner*—Leonard H. Gerin
*Attorney, Agent, or Firm*—Bailin L. Kuch

[57] ABSTRACT

A turret assembly is disclosed which is journaled in a bull ring and driven by a drive box which is mounted on a hinge pivot shaft and which shaft is rotated in response to rotation of the turret with respect to the bull ring.

3 Claims, 5 Drawing Figures

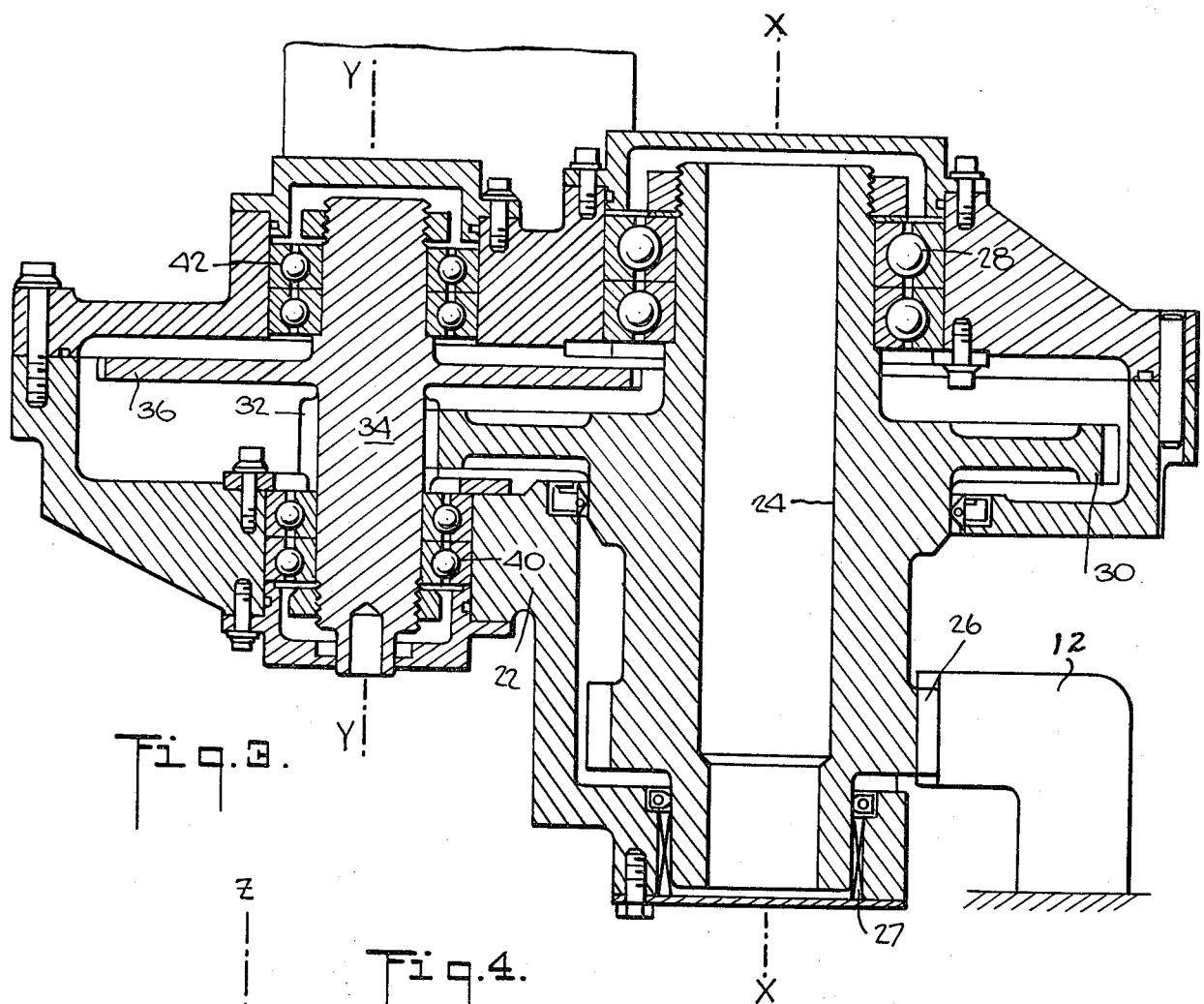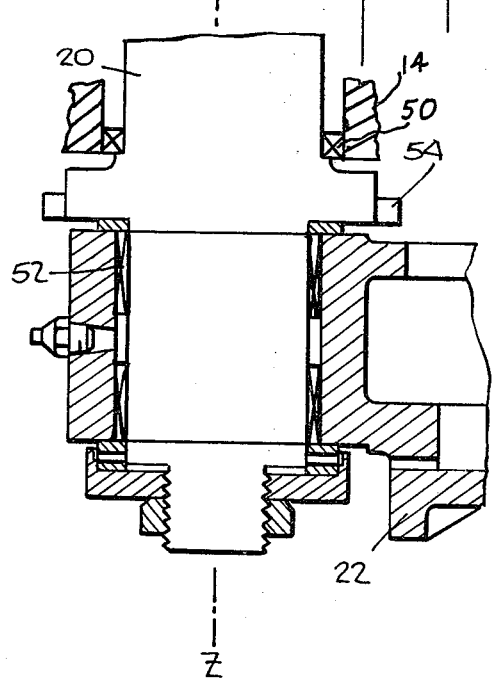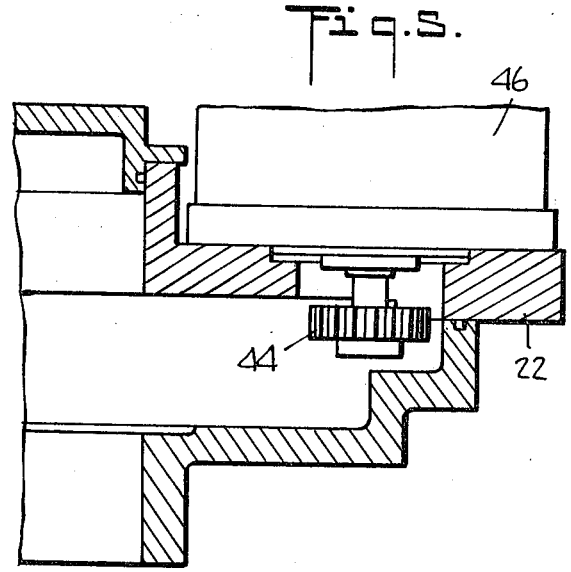

ROTATING HINGE PIN FOR SPRING LOADED GEAR BOX

BACKGROUND OF THE INVENTION

1. Field of the Invention

This invention relates to a hinge pin for a spring loaded pivoted shaft gear box for a naval turret drive system.

2. Background of the Invention

Drive gear boxes for rotating turret drive systems are spring loaded into mesh with their stationary platform bull gears so as to minimize the backlash between the drive and the bull gears to thereby improve the stability and the accuracy of the turret system. The heavy loading on the hinge pivot shaft of the gear box and the usually very small rotational movement of this hinge pivot shaft combine to force lubricant out from between this hinge pivot shaft and its bearings, producing metal to metal contact which in turn produces fretting and resultant failure of these parts.

Turret drive systems of this type are shown in U.S. Pat. No. 1,600,943, issued to Hozlak on Sept. 21, 1926;

U.S. Pat. No. 2,404,907, issued to Heynan on July 30, 1946;

U.S. Pat. No. 2,447,487, issued to Chinn on Aug. 24, 1948;

U.S. Pat. No. 2,484,869, issued to Zeidler on Oct. 18, 1949;

U.S. Pat. No. 2,528,645, issued to Edwards on Nov. 7, 1950;

U.S. Pat. No. 2,791,156, issued to Henstrom on May 7, 1957;

U.S. Pat. No. 2,491,608, issued to Duplessis on Dec. 20, 1949;

U.S. Pat. No. 3,106,132, issued to Biermann et al on Oct. 8, 1963;

U.S. Pat. No. 3,429,222, issued to Whiston et al on Feb. 25, 1969; and

U.S. Pat. No. 3,865,009, issued to Kongelbeck on Feb. 11, 1975.

SUMMARY OF THE INVENTION

An object of this invention is to provide improved lubrication of the hinge pivot shaft of a rotating turret drive gear box.

A feature of this invention is the provision of means for rotating the hinge pivot shaft in response to rotation of the turret with respect to the stationary bull ring.

BRIEF DESCRIPTION OF THE DRAWING

These and other objects, features and advantages of this invention will become apparent from the following specification thereof taken in conjunction with the accompanying drawings in which:

FIG. 3 is a side view in cross-section of the drive assembly of FIG. 2 taken along the plane III—III;

FIG. 4 is a detail side view in cross-section of the drive assembly of FIG. 2 taken along the plane IV—IV; and FIG. 5 is a detail side view in cross-section of the drive assembly of FIG. 2 taken along the plane V—V.

DESCRIPTION OF THE INVENTION

Figure 1:
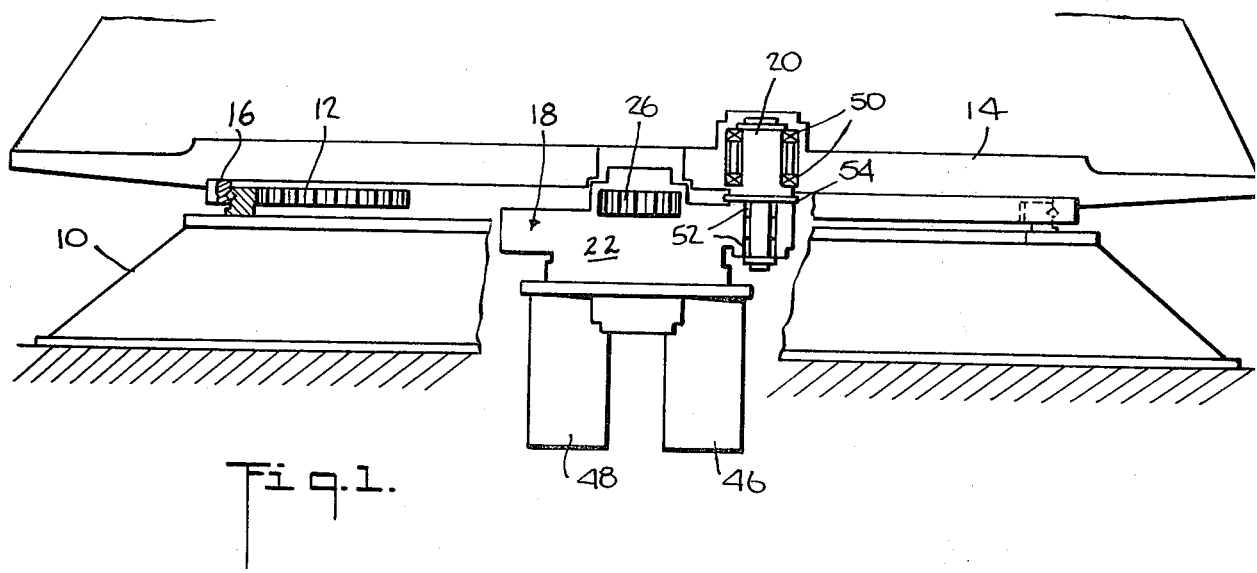
FIG. 1 is a schematic drawing of a turret system embodying this invention.
Figure 2:
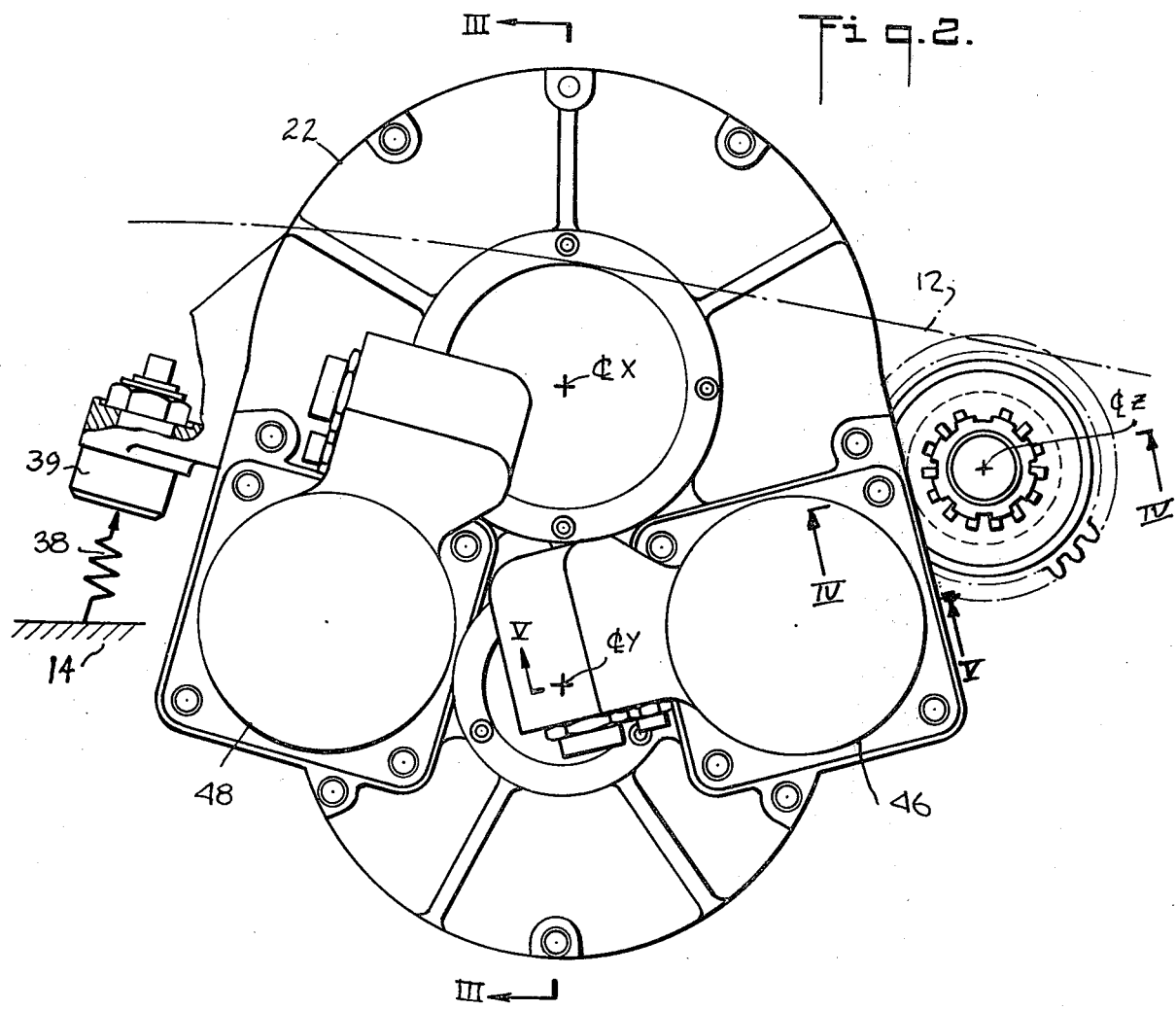
FIG. 2 is a bottom plan view of the drive assembly of FIG. 1.

As shown in FIG. 1, the turret system comprises a fixed turret base 10 to which is fixed an annular internal gear or bull ring 12. The rotating main body 14 of the turret has a main bearing 16 which is journaled onto the bull ring 12. A drive assembly 18 is journaled to the turret main body by a hinge or pivot pin 20 which is journaled to and between the turret main body 14 and the housing 22 of the drive assembly. A tubular output shaft 24 has an integral annular gear 26 which is meshed with the bull ring 12. The shaft 24 is journaled to the housing 22 by a lower needle bearing 27 and an upper pair of ball bearings 28. The shaft 24 also has an upper integral annular gear 30 which is meshed with a lower integral annular gear 32 on an idler shaft 34 which also has an upper integral annular gear 36. A spring 38 is secured to and between the rotating main body 14 and a pad 39 fixed to the drive gear housing 22 to urge the gear 26 into mesh with the bull ring 12. The shaft 34 is journaled to the drive housing by a lower pair of ball bearings 406 and an upper pair of ball bearings 42. The annular gear 36 is meshed with two output spur gears 44 respectively driven by two electric drive motors 46 and 48 which are respectively fixed to the housing 22.

The hinge pin 20 is journaled to the turret main body 14 by an upper pair of ball bearings 50 and to the drive gear housing by a lower pair of needle bearings 52. The pin 20 has an integral annular gear 54 which is also meshed with the bull ring 12. Thus, as the turret rotates with respect to the bull ring, the bull ring drives the hinge pin 20 to rotate in its bearings, resulting in a continual lubrication of these bearings, thereby preventing metal to metal contact and eliminating fretting.

The invention has thus been described but is desired to be understood that it is not confined to the particular forms or usages shown and described. The same being merely illustrative, and that the invention may be carried out in other ways without departing from the spirit of the invention, and therefore, the right is broadly claimed to employ all equivalent instrumentalities coming within the scope of the appendent claims, and by means of which objects of this invention are attained and new results accomplished, as it is obvious that the particular embodiment herein shown and described is only one of the many that can be employed to obtain these objects and accomplish these results.

What is claimed is:

1. A turret assembly comprising:
    a rotatable turret;
    a stationary bull ring;
    a drive assembly including
        a housing;
        a hinge pin journaled to and between said housing and said turret;
        a drive gear journaled to said housing and meshed with said bull ring;
        first drive means coupled to said drive gear for rotating said drive gear and thereby said turret with respect to said bull ring; and
        second drive means coupled to said hinge pin for rotating said hinge pin with respect to said housing and said turret.

2. A turret assembly according to claim 1 wherein:
    said second drive means comprises a gear fixed to said hinge pin and meshed with said bull ring, whereby as said turret rotates with respect to said bull ring, said bull ring rotates said hinge pin.

3. A turret assembly according to claim 1 further including:
    a spring means coupled to and between said turret and said housing for urging said drive gear into mesh with said bull ring.

* * * * *